US012695394B2

(12) United States Patent
Miyazaki

(10) Patent No.: US 12,695,394 B2
(45) Date of Patent: Jul. 28, 2026

(54) OUTPUT STABILIZING CIRCUIT AND DC/DC CONVERTER CIRCUIT

(71) Applicant: SUMIDA CORPORATION, Tokyo (JP)

(72) Inventor: Hiroyuki Miyazaki, Natori (JP)

(73) Assignee: SUMIDA CORPORATION (JP)

( * ) Notice: Subject to any disclaimer, the term of this patent is extended or adjusted under 35 U.S.C. 154(b) by 275 days.

(21) Appl. No.: 18/576,261

(22) PCT Filed: Mar. 23, 2022

(86) PCT No.: PCT/JP2022/013634
§ 371 (c)(1),
(2) Date: Jun. 21, 2024

(87) PCT Pub. No.: WO2023/007839
PCT Pub. Date: Feb. 2, 2023

(65) Prior Publication Data
US 2025/0266772 A1 Aug. 21, 2025

(30) Foreign Application Priority Data
Jul. 29, 2021 (JP) ................................. 2021-124318

(51) Int. Cl.
*H02M 3/338* (2006.01)
*H02M 1/00* (2006.01)
(Continued)

(52) U.S. Cl.
CPC ....... *H02M 3/3385* (2013.01); *H02M 1/0006* (2021.05); *H02M 3/01* (2021.05); *H02M 3/33571* (2021.05); *H02M 3/33573* (2021.05)

(58) Field of Classification Search
CPC .... H02M 3/3385; H02M 1/0006; H02M 3/01; H02M 3/33573; H02M 3/33571
See application file for complete search history.

(56) References Cited

U.S. PATENT DOCUMENTS 6,831,846 B2    12/2004   Yasumura
7,298,633 B2 *  11/2007   Yasumura ........... H02M 3/3385
                                                                363/21.02
(Continued)

FOREIGN PATENT DOCUMENTS

CN          87201126 U      1/1988
CN          107040241 A     8/2017
(Continued)

OTHER PUBLICATIONS

International Search Report of the International Searching Authority, issued in PCT/JP2022/013634, mailed May 31, 2022; ISA/JP (5 pages).
(Continued)

*Primary Examiner* — Adolf D Berhane
(74) *Attorney, Agent, or Firm* — Harness, Dickey & Pierce, P.L.C.

(57) ABSTRACT

An output stabilization circuit (1) includes: a primary-side circuit (2) including a self-oscillation circuit (10) connected to a DC power supply; and a secondary-side circuit (3) obtaining an output voltage by oscillation of the self-oscillation circuit, wherein the self-oscillation circuit includes a drive transformer of which a secondary-side coil is connected to a gate electrode of each of a plurality of switching elements connected in a half-bridge configuration or a full-bridge configuration, a feedback transformer of which a primary-side coil is connected to a power transmission coil, and a phase shift filter that is connected between a secondary-side coil of the feedback transformer and a primary-side coil of the drive transformer and includes a primary-side control coil having a characteristic that an inductance changes in accordance with a current flowing through a secondary-side control coil of the secondary-side circuit.

2 Claims, 5 Drawing Sheets

(51) Int. Cl.
    *H02M 3/00*       (2006.01)
    *H02M 3/335*    (2006.01)

(56) References Cited

U.S. PATENT DOCUMENTS

| | | | |
|---|---|---|---|
| 7,388,760 B2 | 6/2008 | Yasumura | |
| 10,594,225 B1 * | 3/2020 | Lin | H02M 3/285 |
| 10,819,244 B1 * | 10/2020 | Shi | H02M 3/33569 |
| 11,750,105 B1 * | 9/2023 | Hung | H02M 1/346 |
| | | | 363/17 |
| 11,855,546 B2 * | 12/2023 | Miyazaki | H02M 1/0025 |
| 2002/0080634 A1 | 6/2002 | Nozawa et al. | |
| 2004/0196671 A1 | 10/2004 | Yasumura | |
| 2006/0164870 A1 | 7/2006 | Yasumura | |
| 2017/0117850 A1 | 4/2017 | Nomura et al. | |
| 2017/0294844 A1 | 10/2017 | Nishijima | |

FOREIGN PATENT DOCUMENTS

| | | | |
|---|---|---|---|
| CN | 111342668 A | 6/2020 | |
| JP | H11-164551 A | 6/1999 | |
| JP | 2001-119943 A | 4/2001 | |
| JP | 2002209381 A | 7/2002 | |
| JP | 2009-100640 A | 5/2009 | |
| JP | 2014060895 A | 4/2014 | |
| JP | 2017192281 A | 10/2017 | |
| JP | 2020188538 A | 11/2020 | |
| WO | 2005-036741 A1 | 4/2005 | |

OTHER PUBLICATIONS

European Search Report issued in the corresponding European Patent Application No. 22848923.3; dated Jul. 8, 2025 (total 11 pages).

Decision to Grant a Patent issued in the corresponding Japanese Patent Application No. 2021-124318; mailed Aug. 19, 2025 (total 5 pages).

Office Action issued in the corresponding Chinese Patent Application No. 202280029703.X; dated May 1, 2026 (total 18 pages).

* cited by examiner

OUTPUT STABILIZING CIRCUIT AND DC/DC CONVERTER CIRCUIT

TECHNICAL FIELD

The present invention relates to a self-oscillation type circuit and a DC-DC converter circuit.

BACKGROUND ART

In a current-resonance type DC-DC converter, a separate-excitation system that gives an on-off signal to a switching element by a control circuit such as a control IC or the like is used.

Patent Document 1 below discloses a DC-DC converter in which a series circuit of switch elements 1 and 2 is connected to a DC power supply, and a series circuit of a capacitor 3 and a primary winding 5 of a transformer 4 is connected in parallel to the switch element 2. In this DC-DC converter, a tertiary winding 6 and a quaternary winding 7 are further added to the transformer 4, an on-off signal is given to the switch element 2 via the tertiary winding 6, the quaternary winding 7 is used as a power supply winding of a control circuit 18, the control circuit 18 detects the timing of switching the voltage of the quaternary winding between positive and negative, and the on-off signal is given to the switch element 1 at this timing. By shortening the ON time of the switch element 1 in this manner, the reactive current is reduced.

CITATION LIST

Patent Document

Patent Document 1: JP 2002-209381 A

SUMMARY OF THE INVENTION

Problem to be Solved by the Invention

However, the above-described separate-excitation oscillation circuit requires a control circuit, and the circuit becomes complicated.

The present invention provides a series resonant type self-oscillation circuit technology that stabilizes an output voltage with a simple circuit configuration.

Means for Solving the Problem

According to the present inventions, an output stabilization circuit includes: a primary-side circuit including a self-oscillation circuit connected to a DC power supply; and a secondary-side circuit that obtains an output voltage by oscillation of the self-oscillation circuit, wherein the self-oscillation circuit includes a power transmission coil, a resonance capacitor that is connected in series with the power transmission coil and constitutes a series resonant circuit together with the power transmission coil, a switching circuit including a plurality of switching elements connected in a half-bridge configuration or a full-bridge configuration, the switching circuit being configured to switch a direction of a current flowing through the power transmission coil in accordance with an on-off state of the plurality of switching elements, a drive transformer of which a secondary-side coil is connected to a gate electrode of each of the plurality of switching elements, a feedback transformer of which a primary-side coil is connected to the power transmission coil, and a phase shift filter connected between a secondary-side coil of the feedback transformer and a primary-side coil of the drive transformer, the secondary-side circuit includes a power reception coil magnetically coupled to the power transmission coil, and a secondary-side control coil in which a magnitude of a current flowing is controlled in accordance with a magnitude of the output voltage, and the phase shift filter includes a primary-side control coil that is magnetically coupled to the secondary-side control coil and has a characteristic that an inductance changes in accordance with the current flowing through the secondary-side control coil.

Effect of the Invention

According to the aspect described above, it is possible to provide a series resonant type self-oscillation circuit technology that stabilizes an output voltage with a simple circuit configuration.

DESCRIPTION OF EMBODIMENTS

Hereinafter, examples of preferred embodiments of the present invention (hereinafter, referred to as the present embodiment) will be described. Note that the following embodiments are examples, and the present invention is not limited to the configurations of the following embodiments.

First Embodiment

Figure 1:
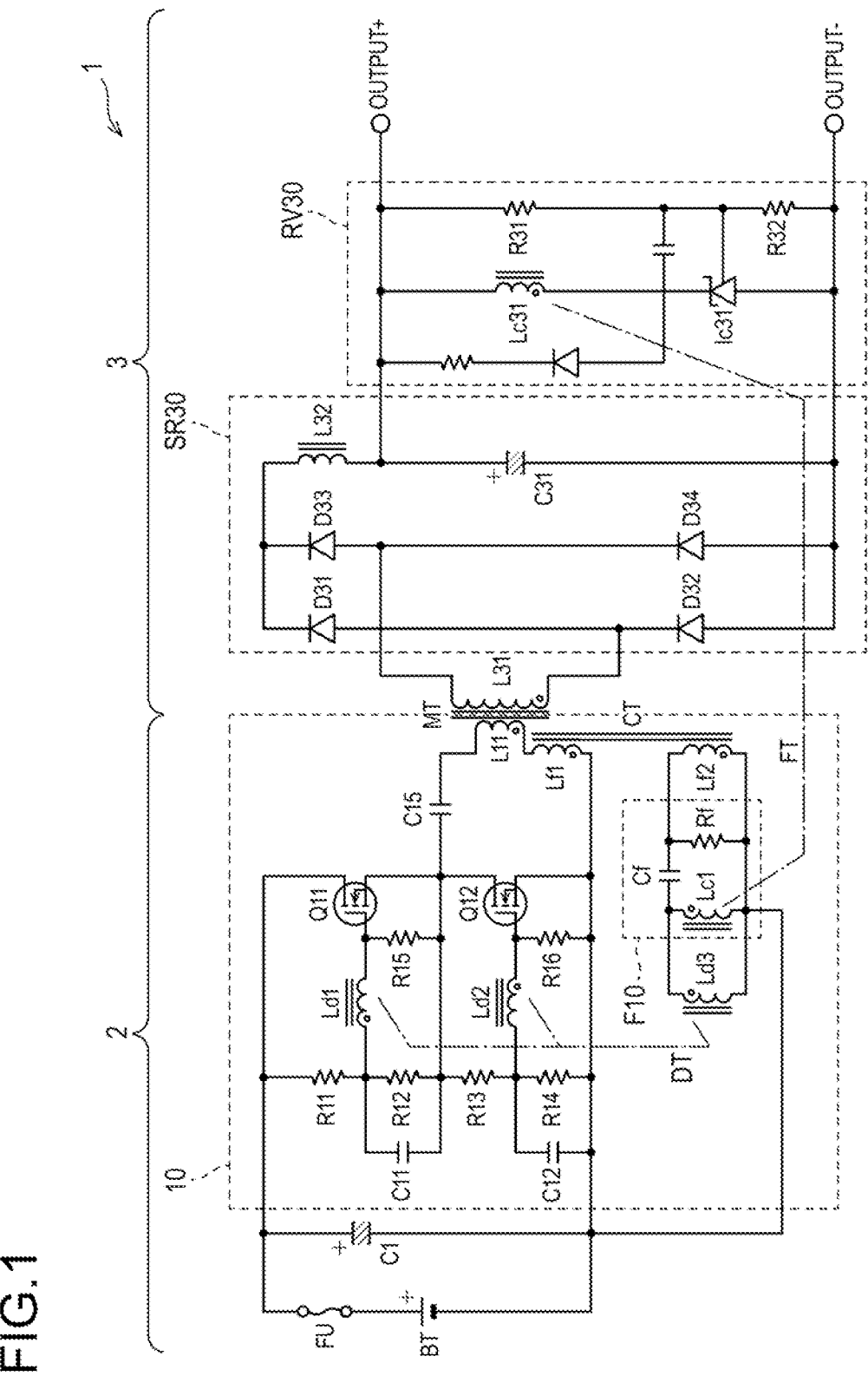
FIG. 1 is a circuit diagram of a power supply circuit in a first embodiment.

FIG. 1 is a circuit diagram of a power supply circuit 1 in a first embodiment.

The power supply circuit 1 includes a primary-side circuit 2 having a battery device BT and a secondary-side circuit 3 that obtains power from the primary-side circuit 2, and is a circuit that stably provides an output to a load connected to the secondary-side circuit 3. In the first embodiment, an example is shown in which the battery device BT is a battery device that supplies DC power, the secondary-side circuit 3 includes a DC conversion circuit, and the power supply circuit 1 functions as a DC-DC converter circuit as a whole.
<Primary-Side Circuit>

The primary-side circuit 2 includes a battery device BT, a fuse FU, a capacitor C1, and a self-oscillation circuit 10.

The fuse FU disconnects the battery device BT from the primary-side circuit 2 when an excessive current is generated due to an abnormality in the self-oscillation circuit 10 of the primary-side circuit 2. As a result, abnormal heating of the battery device BT due to an excessive current can be prevented.

The capacitor C1 absorbs a change in voltage due to charging and discharging of the battery device BT.

The self-oscillation circuit 10 includes resistance elements R11, R12, R13, and R14 connected in series. The resistance elements R11, R12, R13, and R14 are connected in parallel to the battery device BT, and apply a bias voltage to respective gates of transistors Q11 and Q12. The resistance elements R11, R12, R13, and R14 may be referred to as bias circuits.

The capacitor C11 is connected in parallel to the resistance element R12, and a capacitor C12 is connected in parallel to the resistance element R14. The capacitors C11 and C12 act as bypass capacitors, and apply a stable voltage to the gates of the transistors Q11 and Q12 by bypassing an AC component of power (drive signal) induced in drive coils Ld1 and Ld2 that are secondary-side coils of a drive transformer DT described later.

The self-oscillation circuit 10 further includes two transistors Q11 and Q12 that are connected in a half-bridge configuration. The transistors Q11 and Q12 are field effect transistors (FETs) and are switching elements.

The source of the transistor Q11 and the drain of the transistor Q12 are connected, the drain of the transistor Q11 is connected to the positive terminal of the battery device BT, and the source of the transistor Q12 is connected to the negative terminal of the battery device BT.

The respective gates of the transistors Q11 and Q12 are connected to the above-described bias circuit via a secondary-side coil of the drive transformer DT described later. Specifically, the output end of the resistance element R11 is connected to the resistance element R12 and the drive coil Ld1 that is a secondary-side coil of the drive transformer DT, and the output end of the resistance element R13 is connected to the resistance element R14 and the drive coil Ld2 that is a secondary-side coil of the drive transformer DT.

Furthermore, a resistance element R15 or R16 is connected between the gate and the source in the transistors Q11 and Q12. The resistance elements R15 and R16 discharge the charge of the gate-source capacitance (Ciss) of the transistors Q11 and Q12, thereby speeding up the OFF time of the transistors Q11 and Q12.

In this manner, it is configured that the direction of the current flowing through a power transmission coil L11 to be described later is switched according to the on-off states of the transistors Q11 and Q12, and the self-oscillation circuit 10 can be referred to as having a switching circuit including the transistors Q11 and Q12.

The self-oscillation circuit 10 further includes the power transmission coil L11 and a resonance capacitor C15 connected in series. The power transmission coil L11 and the resonance capacitor C15 constitute a series resonant circuit together.

This series resonant circuit is connected to the source of the transistor Q11 and is provided between the drain and the source of the transistor Q12. As a result, when the transistor Q11 is in the ON state and the transistor Q12 is in the OFF state, the current flows from the resonance capacitor C15 toward the power transmission coil L11, whereas when the transistor Q11 is in the OFF state and the transistor Q12 is in the ON state, the current flows from the power transmission coil L11 toward the resonance capacitor C15 by the power stored in the resonance capacitor C15.

The power transmission coil L11 is magnetically coupled to a power reception coil L31 of the secondary-side circuit 3, and constitutes a main transformer MT. As a result, the oscillation power generated by the self-oscillation circuit 10 is transmitted from the power transmission coil L11 that is a primary-side coil of the main transformer MT, to the power reception coil L31 that is a secondary-side coil of the main transformer MT.

The self-oscillation circuit 10 further includes a feedback transformer CT and the drive transformer DT.

The feedback transformer CT includes a feedback coil Lf1 as a primary-side coil and a feedback coil Lf2 as a secondary-side coil. That is, the feedback coils Lf1 and Lf2 are magnetically coupled.

The feedback coil Lf1 is connected in series to the power transmission coil L11 and the resonance capacitor C15. The feedback transformer CT is a current transformer, detects an AC current generated on the primary side of the main transformer MT by the feedback coil Lf1, and transmits the AC current to the feedback coil Lf2. In the feedback transformer CT, the number of windings of the feedback coil Lf1 that is the primary winding is smaller than the number of windings of the feedback coil Lf2 that is the secondary winding, and the current flowing through the feedback coil Lf1 is converted into a smaller current, and the smaller current is induced in the feedback coil Lf2.

The feedback coil Lf2 is connected to a phase shift filter F10.

The drive transformer DT includes a drive coil Ld3 as a primary-side coil and drive coils Ld1 and Ld2 as secondary-side coils. That is, the drive coil Ld3 is magnetically coupled to and the drive coils Ld1 and Ld2.

The drive coil Ld3 is connected to the phase shift filter F10. The drive coil Ld1 is connected to the gate of the transistor Q11 on one side, and connected to the output terminal of the resistance element R11 and the input terminal of the resistance element R12 on the other side. The drive coil Ld2 is connected to the gate of the transistor Q12 on one side, and connected to the output terminal of the resistance element R13 and the input terminal of the resistance element R14 on the other side.

Furthermore, as illustrated in FIG. 1, connection is made such that the polarities of the drive coils Ld1 and Ld2 relative to the gate of the transistor Q11 or Q12 are mutually opposite.

As described above, in the present embodiment, the output of the drive transformer DT is applied to the respective gates of the transistors Q11 and Q12, and the switching timing of the transistors Q11 and Q12 is taken by the drive transformer DT.

The phase shift filter F10 is connected between the feedback coil Lf2 that is a secondary-side coil of the feedback transformer CT and the drive coil Ld3 that is a primary-side coil of the drive transformer DT.

The phase shift filter F10 includes a resistance element Rf, a control coil Lc1, and a capacitor Cf, and can also be referred to as an RLC filter. In the example of FIG. 1, the resistance element Rf and the control coil Lc1 are connected in parallel to the feedback coil Lf2 and the drive coil Ld3, and the capacitor Cf is connected in series to the feedback coil Lf2 and the drive coil Ld3.

With such a configuration, the phase shift filter F10 shifts the phase of the AC voltage applied to the resistance element Rf according to the AC current generated in the feedback coil Lf2 and applies the AC voltage to the drive coil Ld3 that is the primary-side coil of the drive transformer DT.

Here, the phase of the AC voltage applied to the drive coil Ld3 is shifted from the phase of the output of the secondary-side coil of the feedback transformer CT by a phase shift amount according to the polarities of the feedback coil Lf2 and the drive coil Ld3, the filter constant of the phase shift filter F10, and the like.

The phase shift amount by the phase shift filter F10 is variable according to the filter constant of the phase shift filter F10 such as the resistance value of the resistance element Rf, the inductance of the control coil Lc1, the capacitance of the capacitor Cf, and the like. In the present embodiment, since the inductance of the control coil Lc1 is variable according to the output voltage of the secondary-side circuit 3, the phase shift amount of the phase shift filter F10 is also variable.

Specifically, the control coil Lc1 of the phase shift filter F10 constitutes a control transformer FT together with a control coil Lc31 described later of the secondary-side circuit 3, and has a characteristic that the inductance changes according to the current flowing through the control coil Lc31. Hereinafter, in some cases, the control coil Lc1 of the phase shift filter F10 included in the primary-side circuit 2 may be referred to as a primary-side control coil Lc1, and the control coil Lc31 included in the secondary-side circuit 3 may be referred to as a secondary-side control coil Lc31.

<Secondary-Side Circuit>

The secondary-side circuit 3 includes the power reception coil L31, a rectifier circuit SR30, a reference voltage circuit RV30, and the like.

As described above, the power reception coil L31 constitutes the main transformer MT as a secondary-side coil having the power transmission coil L11 as a primary-side coil, and generates an induced electromotive force by a current of the power transmission coil L11.

The rectifier circuit SR30 is connected to the power reception coil L31. The rectifier circuit SR30 includes a bridge rectifier circuit including diodes D31, D32, D33, and D34, and a smoothing filter including a coil L32 and a capacitor C31, and functions as a full-wave rectifier circuit. That is, the rectifier circuit SR30 performs full-wave rectification and smoothing on the AC voltage generated by the power reception coil L31, and converts the AC voltage into a DC voltage.

The reference voltage circuit RV30 is a circuit that includes resistance elements R31 and R32 and a shunt regulator element Ic31 and stabilizes the output voltage from the secondary-side circuit 3 to be equal to or higher than the reference voltage.

The shunt regulator element Ic31 receives, at a reference terminal, an input of a voltage obtained by dividing the output voltage by the resistance elements R31 and R32, and controls the voltage between the reference and the anode to be a reference voltage.

The reference voltage circuit RV30 further includes the secondary-side control coil Lc31.

A current according to the voltage control of the shunt regulator element Ic31 flows through the secondary-side control coil Lc31. That is, when the output voltage becomes higher than the reference voltage, the current flowing through the secondary-side control coil Lc31 increases, and when the output voltage becomes lower than the reference voltage, the current flowing through the secondary-side control coil Lc31 decreases.

As described above, the secondary-side control coil Lc31 is magnetically coupled to the primary-side control coil Lc1 by the control transformer FT, and the inductance of the primary-side control coil Lc1 is variable by the amount of current flowing through the secondary-side control coil Lc31. The primary-side control coil Lc1 and the secondary-side control coil Lc31 are provided on a common core as a primary winding and a secondary winding and form a single-magnetic-path transformer. Then, this transformer is configured to have an inductance DC superposition characteristic such that the inductance reduction rate of the primary-side control coil Lc1 becomes large as the DC current flowing through the secondary-side control coil Lc31 becomes large, for example. As a result, in the phase shift filter F10, the phase shift amount becomes large as the inductance value of the primary-side control coil Lc1 becomes large due to the RLC filter characteristic.

With such a configuration, it is possible to increase or decrease the phase shift amount of the phase shift filter F10 according to the output voltage from the secondary-side circuit 3. By a change in the drive timing of the transistors Q11 and Q12 caused by this, the oscillation frequency on the primary side of the main transformer MT is brought close to or away from the resonance frequency. As a result, it is possible to stabilize the output voltage from the secondary-side circuit 3.

<Operation>

Hereinafter, the operation of the power supply circuit 1 in the first embodiment having the above-described configuration will be described.

In the primary-side circuit 2, when DC power is supplied from the battery device BT to the resistance elements R11, R12, R13, and R14 as the bias circuits, voltages divided by the resistance elements of the bias circuits are respectively applied as bias voltages to the gates of the transistors Q11 and Q12. As a result, either the transistor Q11 or Q12 becomes the ON state first.

At this time, when the transistor Q11 becomes the ON state and the transistor Q12 becomes the OFF state, the current flows through the path between the drain and the source of the transistor Q11, the capacitor C15, the power transmission coil L11, and the feedback coil Lf1 by the power supplied from the battery device BT. This current becomes the resonance current of the primary-side leakage inductance of the main transformer MT and the capacitor 15, and at this time, the capacitor C15 is charged.

When a current flows through the power transmission coil L11 that is a primary-side coil, a magnetic field is generated in the main transformer MT, and an induced electromotive force is generated in power reception coil L31 that is a secondary-side coil. The output impedance of the induced electromotive force generated in the power reception coil L31 can be set according to the winding ratio between the power transmission coil L11 and the power reception coil L31.

In addition, when a current flows through the feedback coil Lf1 that is a primary-side coil of the feedback transformer CT, a current is also induced in the feedback coil Lf2 that is a secondary-side coil of the feedback transformer CT. A voltage is applied to the resistance element Rf according to the current induced in the feedback coil Lf2, and the phase of the voltage is shifted by the phase shift filter F10 and applied to the drive coil Ld3.

When power is supplied to the drive coil Ld3 that is a primary-side coil of the drive transformer DT, a magnetic field is generated in the drive transformer DT, and induced electromotive force is generated in the drive coils Ld1 and Ld2 that are secondary-side coils. As described above, since the drive coils Ld1 and Ld2 have mutually opposite polarities with respect to the gate of the transistor Q11 or Q12, the voltages induced in the drive coil Ld1 and the drive coil Ld2 have opposite phases.

As a result, a negative voltage is applied to the transistor Q11, the bias voltage applied to the transistor Q11 becomes equal to or lower than the threshold voltage, and the transistor Q11 becomes the OFF state. On the other hand, a positive voltage is applied to the transistor Q12, the bias voltage applied to the transistor Q12 exceeds the threshold voltage, and the transistor Q12 becomes the ON state. That is, the on-off states of the transistors Q11 and Q12 are switched.

When the transistor Q11 becomes the OFF state and the transistor Q12 becomes the ON state, the current flows in a direction opposite to the above case through the path between the drain and the source of the transistor Q12, the feedback coil Lf1, the power transmission coil L11, and the capacitor 15 by the power charged in the capacitor C15. The current in this case also becomes the resonance current of the primary-side leakage inductance of the main transformer MT and the capacitor 15.

As described above, in the primary-side circuit 2, the ON state and the OFF state of the transistors Q11 and Q12 are alternately repeated, so that currents having mutually-different directions flow alternately through the power transmission coil L11 and the feedback coil Lf1.

By such an operation of the primary-side circuit 2, a magnetic field is generated in the main transformer MT, and an AC voltage is induced in the power reception coil L31 that is a secondary-side coil in the secondary-side circuit 3. In the secondary-side circuit 3, the AC voltage generated by the power reception coil L31 in this manner is input to the rectifier circuit SR30, converted into a DC voltage by full-wave rectification and smoothing, and the DC voltage is input to the reference voltage circuit RV30, so that the output voltage is controlled to be the reference voltage by the shunt regulator element Ic31 and is output.

At this time, a current amount corresponding to the output voltage flows through the secondary-side control coil Lc31. The inductance value of the primary-side control coil Lc1 magnetically coupled to the secondary-side control coil Lc31 changes according to the amount of current. As the inductance value of the primary-side control coil Lc1 changes, the phase shift amount of the phase shift filter F10 changes.

In the present embodiment, when the output voltage becomes higher than the reference voltage, the current flowing through the secondary-side control coil Lc31 increases, the inductance value of the primary-side control coil Lc1 decreases, and the phase shift amount of the phase shift filter F10 becomes large. On the other hand, when the output voltage becomes lower than the reference voltage, the current flowing through the secondary-side control coil Lc31 decreases, the inductance value of the primary-side control coil Lc1 increases, and the phase shift amount of the phase shift filter F10 becomes small.

When the phase shift amount of the phase shift filter F10 becomes large, the drive timing of the transistors Q11 and Q12 by the output of the drive transformer DT becomes earlier (the self-oscillation frequency becomes higher), the oscillation frequency on the primary side of the main transformer MT deviates from the resonance frequency, and as a result, the output voltage from the secondary-side circuit 3 decreases. On the other hand, when the phase shift amount of the phase shift filter F10 becomes small, the drive timing of the transistors Q11 and Q12 by the output of the drive transformer DT becomes slower (the self-oscillation frequency becomes lower), the oscillation frequency on the primary side of the main transformer MT approaches the resonance frequency, and as a result, the output voltage from the secondary-side circuit 3 increases.

Therefore, according to the present embodiment, it is possible to realize a self-oscillation circuit of a series resonant type capable of stabilizing the output voltage with a simple circuit configuration without requiring a control circuit like the separate-excitation oscillation circuit. Therefore, the power supply circuit 1 in the present embodiment can be referred to as an output stabilization circuit.

Second Embodiment

Figure 2:
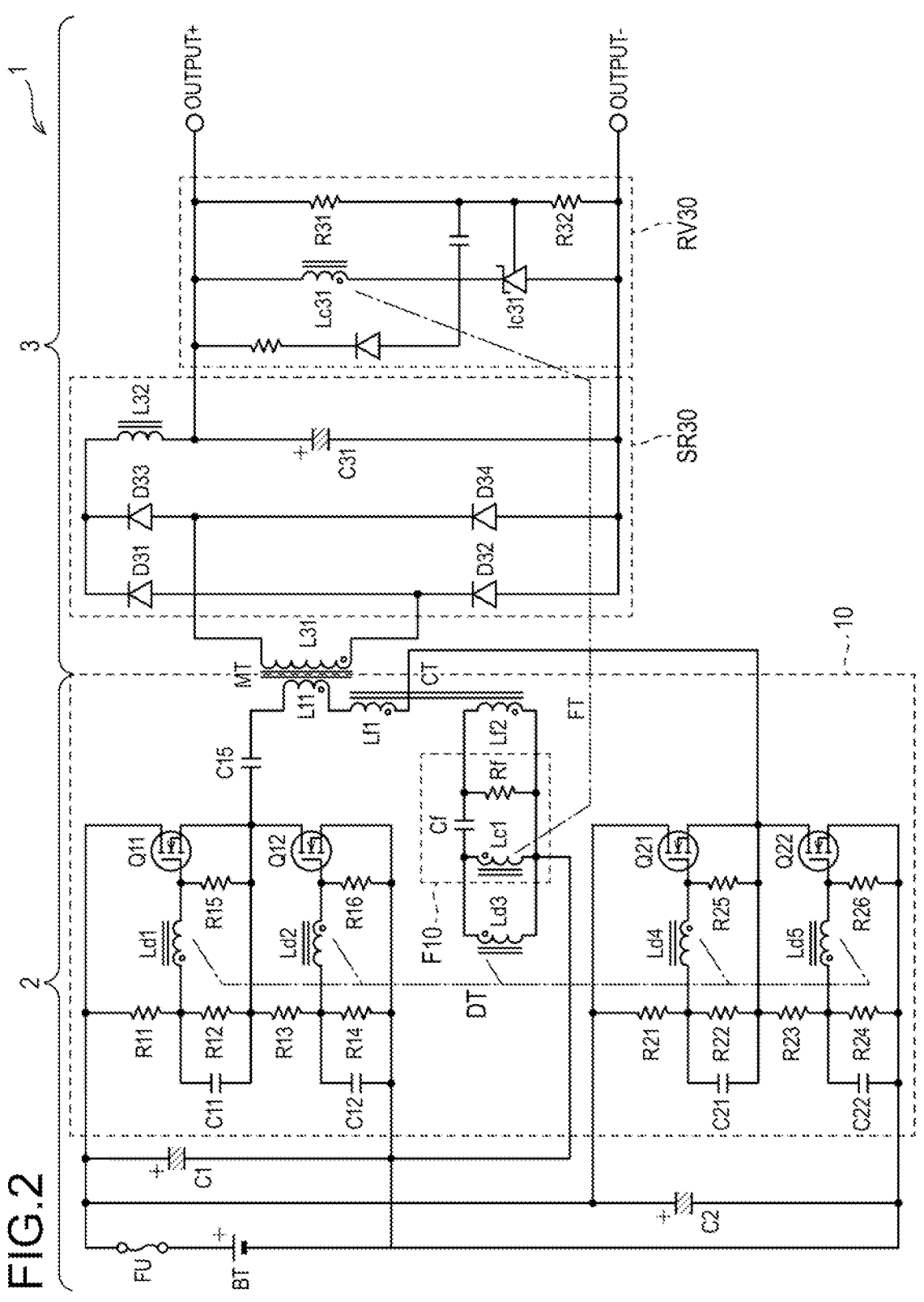
FIG. 2 is a circuit diagram of a power supply circuit in a second embodiment.

FIG. 2 is a circuit diagram of a power supply circuit 1 in a second embodiment.

The power supply circuit 1 in the second embodiment is different from that of the first embodiment in that the switching circuit in the primary-side circuit 2 includes the transistors Q11, Q12, Q21, and Q22 connected in a full-bridge configuration.

Hereinafter, the power supply circuit 1 in the second embodiment will be described focusing on contents different from those of the first embodiment, and the same contents as those of the first embodiment will not be repeated.

In the second embodiment, the self-oscillation circuit 10 further includes resistance elements R21, R22, R23, and R24 connected in series. The resistance elements R21, R22, R23, and R24 are connected in parallel to the battery device BT, and apply a bias voltage to the gates of the transistors Q21 and Q22. The resistance elements R21, R22, R23, and R24 can also be referred to as bias circuits similarly to the resistance elements R11, R12, R13, and R14.

The capacitor C21 is connected in parallel to the resistance element R22, and the capacitor C22 is connected in parallel to the resistance element R24. The capacitors C21 and C22 act as bypass capacitors, and apply a stable voltage to the gates of the transistors Q21 and Q22 by bypassing an AC component of power (drive signal) induced in drive coils Ld4 and Ld5 that are secondary-side coils of the drive transformer DT described later.

In the second embodiment, the self-oscillation circuit 10 further includes the four transistors Q11, Q12, Q21, and Q22 connected in a full-bridge configuration. The transistors Q11, Q12, Q21, and Q22 are field effect transistors (FETs) and are switching elements.

A connection form between the transistors Q11 and Q12 and other circuit configurations is similar to that of the first embodiment.

The source of the transistor Q21 and the drain of the transistor Q22 are connected, the drain of the transistor Q21 is connected to the positive terminal of the battery device BT, and the source of the transistor Q22 is connected to the negative terminal of the battery device BT.

The respective gates of the transistors Q21 and Q22 are connected to the above-described bias circuit via the secondary-side coil of the drive transformer DT. Specifically, the output end of the resistance element R21 is connected to the resistance element R22 and the drive coil Ld4 that is a secondary-side coil of the drive transformer DT, and the output end of the resistance element R23 is connected to the resistance element R14 and the drive coil Ld5 that is a secondary-side coil of the drive transformer DT.

Furthermore, a resistance element R25 or R26 is connected between the gate and the source in the transistors Q21 and Q22. The resistance elements R25 and R26 discharge the charge of the gate-source capacitance (Ciss) of the transistors Q21 and Q22, thereby speeding up the OFF time of the transistors Q21 and Q22.

In the second embodiment, the direction of the current flowing through the power transmission coil L11 to be described later is switched according to the on-off states of the transistors Q11, Q12, Q21, and Q22 and the self-oscillation circuit 10 can be referred to as having a switching circuit including the transistors Q11, Q12, Q21, and Q22 connected in a full-bridge configuration.

The drive transformer DT in the second embodiment includes the drive coil Ld3 as a primary-side coil and the drive coils Ld1, Ld2, Ld4, and Ld5 as the secondary-side coils. That is, the drive coil Ld3 and the drive coils Ld1, Ld2, Ld4, and Ld5 are magnetically coupled.

The drive coil Ld4 is connected to the gate of the transistor Q21 on one side, and connected to the output terminal of the resistance element R21 and the input terminal of the resistance element R22 on the other side. The drive coil Ld5 is connected to the gate of the transistor Q22 on one side, and connected to the output terminal of the resistance element R23 and the input terminal of the resistance element R24 on the other side.

Furthermore, as illustrated in FIG. 2, a connection is made such that the polarities of the drive coils Ld4 and Ld5 relative to the gate of the transistor Q21 or Q22 are mutually opposite. More specifically, the pair of drive coils Ld1 and Ld5 is connected to the gate of the transistor Q11 or Q22 so as to have the same polarity with respect to the gate of the transistor Q11 or Q22, the pair of drive coils Ld2 and Ld4 is connected to the gate of the transistor Q12 or Q21 so as to have the same polarity with respect to the gate of the transistor Q12 or Q21, and the pair of drive coils Ld1 and Ld5 and the pair of drive coils Ld2 and Ld4 are connected so as to have opposite polarities with respect to the respective gates between the pair so that the pair of transistors Q11 and Q22 becomes to be in the same on-off state of the ON state or the OFF state and the pair of transistors Q12 and Q21 becomes to be in the same on-off state of the ON state or the OFF state.

As described above, in the second embodiment, the output of the drive transformer DT is applied to the gates of the transistors Q11, Q12, Q21, and Q22 and the switching timing of the transistors Q11, Q12, Q21, and Q22 is taken by the drive transformer DT.

<Operation>

Hereinafter, the operation of the power supply circuit 1 in the second embodiment having the above-described configuration will be described.

In the primary-side circuit 2, when DC power is supplied from the battery device BT to the resistance elements R11, R12, R13, R14, R21, R22, R23, and R24 as the bias circuits, voltages divided by the resistance elements of the bias circuits are respectively applied as bias voltages to the gates of the transistors Q11, Q12, Q21, and Q22. As a result, either the pair of transistors Q11 and Q22 or the pair of transistors Q12 and Q21 becomes the ON state first.

At this time, when the pair of transistors Q11 and Q22 becomes the ON state and the transistors Q12 and Q21 become the OFF state, the current flows through the path between the drain and source of the transistor Q11, the capacitor C15, the power transmission coil L11, the feedback coil Lf1, and between the drain and source of the transistor Q22 by the power supplied from the battery device BT. This current is a resonance current of the primary-side leakage inductance of the main transformer MT and the capacitor 15.

Similarly to the first embodiment, when power is supplied to the drive coil Ld3 that is a primary-side coil of the drive transformer DT, a magnetic field is generated in the drive transformer DT, and induced electromotive force is generated in the drive coils Ld1, Ld2, Ld4, Ld5 that are secondary-side coils. As described above, since the pair of drive coils Ld1 and Ld5 and the pair of drive coils Ld2 and Ld4 are connected so as to have opposite polarities with respect to the respective gates between the pair, the power induced in the pair of drive coils Ld1 and Ld5 and the pair of drive coils Ld2 and Ld4 becomes opposite phases.

As a result, a negative voltage is applied to the transistors Q11 and Q22, the bias voltage applied to the transistors Q11 and Q22 becomes equal to or lower than the threshold voltage, and the pair of transistors Q11 and Q22 becomes the OFF state. On the other hand, a positive voltage is applied to the transistors Q12 and Q21, the bias voltage applied to the transistors Q12 and Q21 exceeds the threshold voltage, and the pair of transistors Q12 and Q21 becomes the ON state.

When the pair of transistors Q11 and Q22 becomes the OFF state and the pair of transistors Q12 and Q21 becomes the ON state, a current flows in a direction opposite to the above case through the path between the drain and source of the transistor Q12, between the drain and source of the transistor Q21, the feedback coil Lf1, the power transmission coil L11, and the capacitor 15. The current in this case also becomes the resonance current of the primary-side leakage inductance of the main transformer MT and the capacitor 15.

As described above, in the primary-side circuit 2, the ON state and the OFF state of the pair of transistors Q11 and Q22 and the pair of transistors Q12 and Q21 are alternately repeated, so that currents having mutually-different directions flow alternately through the power transmission coil L11 and the feedback coil Lf1.

Note that other operations are the same as those of the first embodiment, and thus the description will not be repeated.

Therefore, also in the second embodiment, similarly to the first embodiment, it is possible to realize a self-oscillation circuit of a series resonant type capable of stabilizing the output voltage with a simple circuit configuration without requiring a control circuit like the separate-excitation oscillation circuit.

Hereinafter, the above-described contents will be described in more detail with reference to examples. However, the description of the following examples does not add any limitation to the contents described above.

EXAMPLES

The examples show a result of verifying the effect of the first embodiment by simulation.

Figure 3:
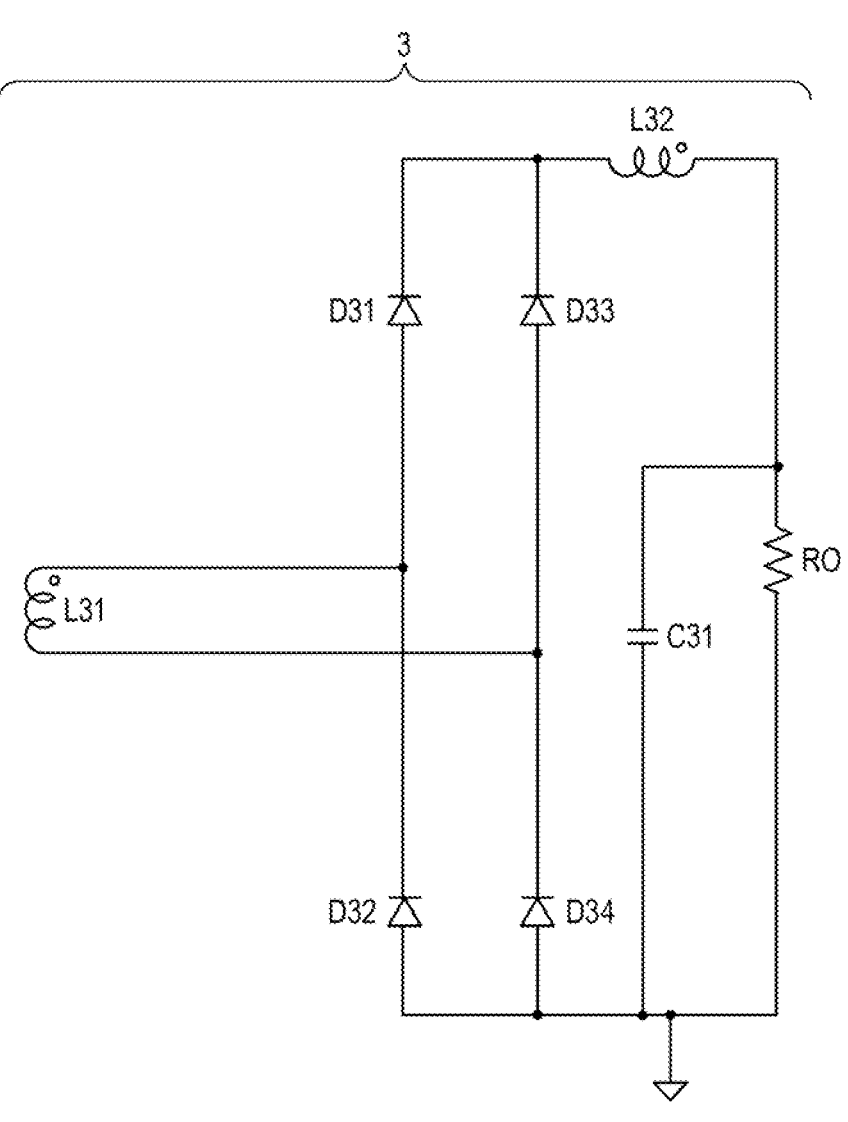
FIG. 3 is a circuit diagram of a secondary-side circuit of a power supply circuit in Example 1.

FIG. 3 is a circuit diagram of the secondary-side circuit 3 of the power supply circuit 1 in Example 1.

In the simulation of Example 1, the inductance of the primary-side control coil Lc1 is not controlled by magnetic coupling between the primary-side control coil Lc1 and the secondary-side control coil Lc31, and the inductance value of the primary-side control coil Lc1 is virtually manually set.

Therefore, the reference voltage circuit RV30 is not provided in the secondary-side circuit 3, and a load resistor RO is connected thereto. Note that the primary-side circuit 2 has the same configuration as that of the first embodiment illustrated in FIG. 1.

Figure 4A:
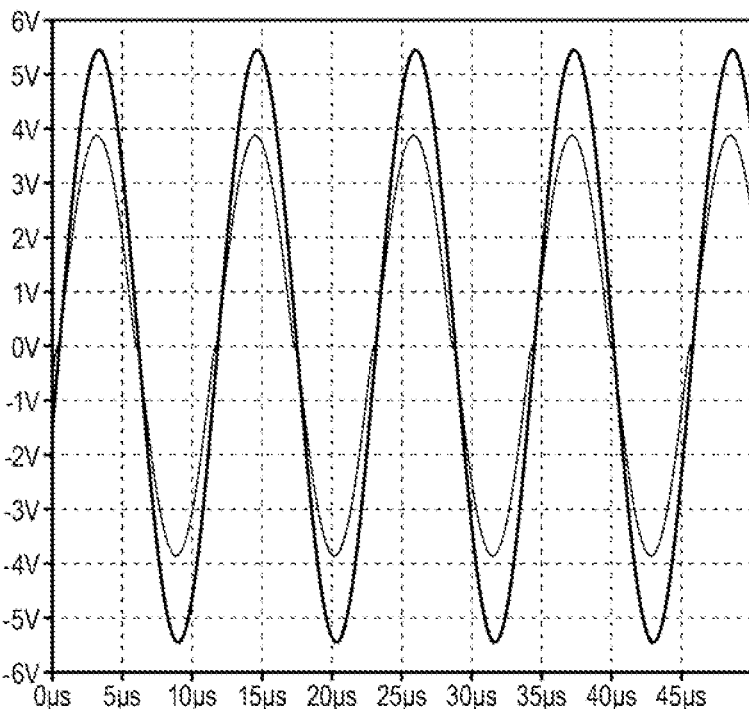
FIG. 4 is a graph indicative of a result of simulating a voltage change at each point in the power supply circuit of Example 1.
Figure 4B:
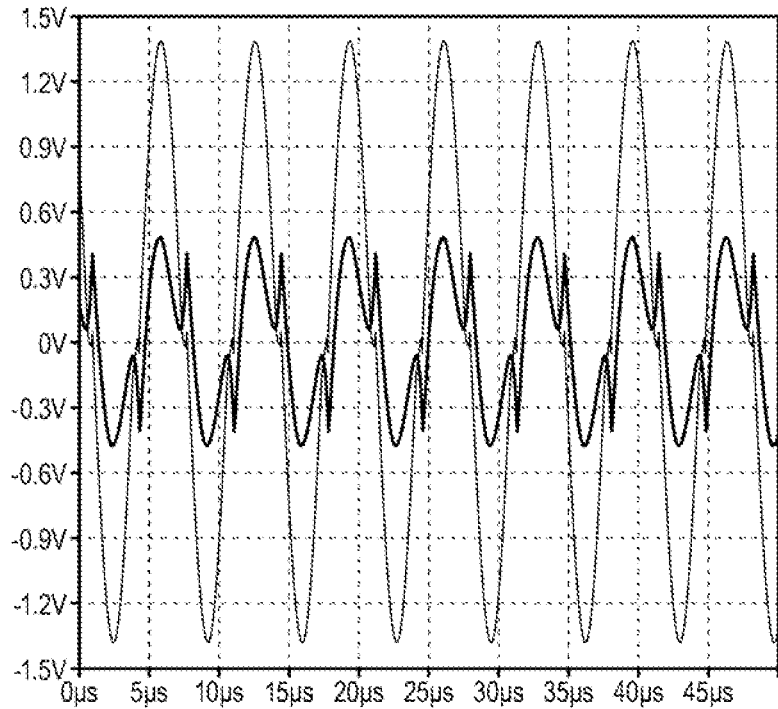
Figure 5A:
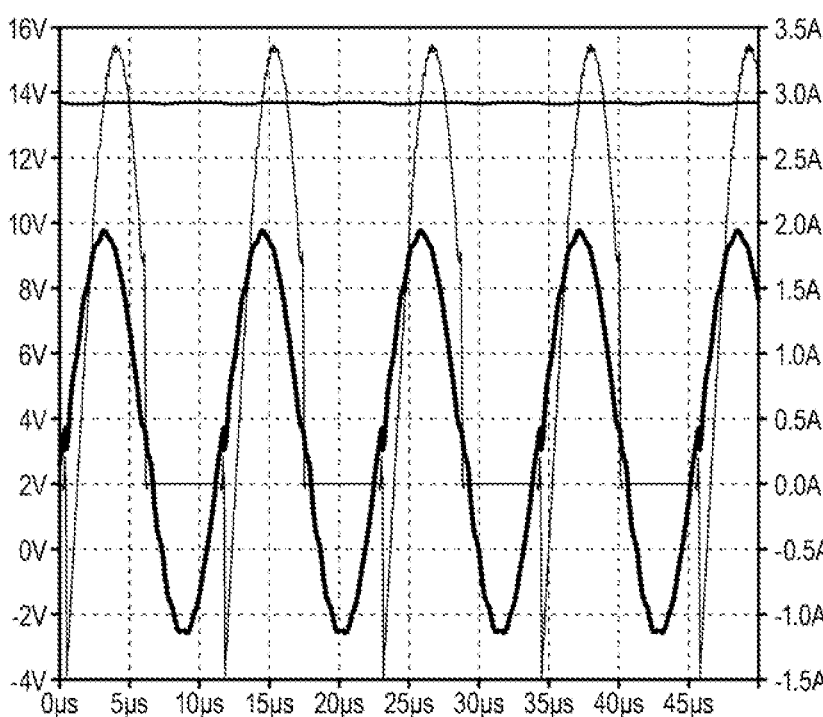
FIG. 5 is a graph indicative of a result of simulating a voltage change at each point in the power supply circuit of Example 1.
Figure 5B:
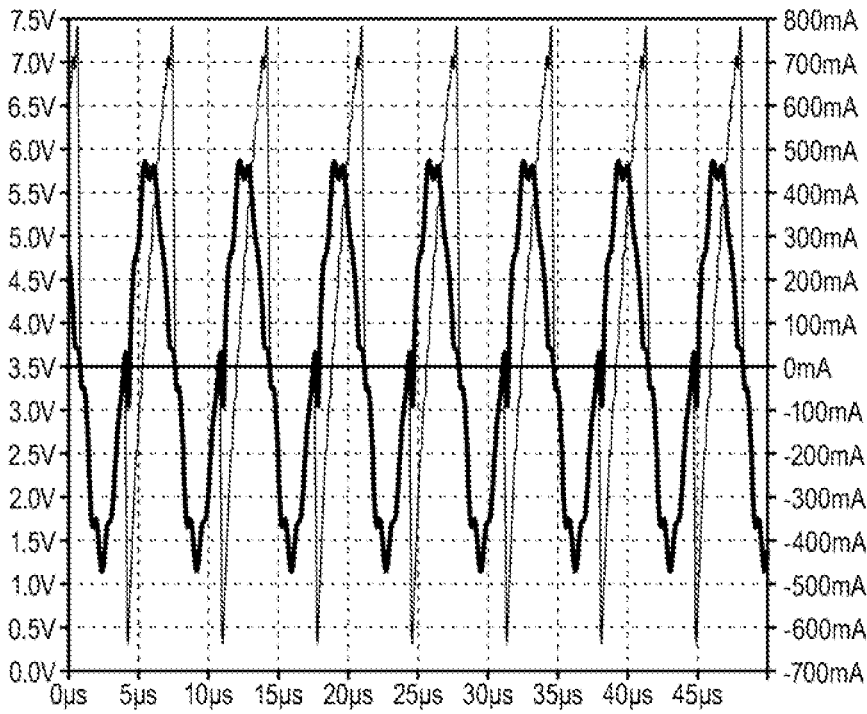

FIG. 4 and FIG. 5 are a graph indicative of a result of simulating a voltage change at each point in the power supply circuit 1 of Example 1. In FIGS. 5 to 7, FIGS. 5A, 6A and 7A illustrate a simulation result in a case where the inductance value of the primary-side control coil Lc1 is set to a first value, and FIGS. 5B, 6B and 7B illustrate a simulation result in a case where the inductance value of the primary-side control coil Lf21 is set to a second value smaller than the first value.

FIGS. 4A and 4B illustrate a voltage waveform (thick line) induced in the feedback coil Lf2 and a voltage waveform (thin line) applied to the drive coil Ld3 after the phase shift filter F10 is applied (after passing) to the output of the feedback coil Nf2.

According to FIG. 4A, in a state where the inductance value of the primary-side control coil Lc1 is the first value (large), the phase shift amount of the phase shift filter F10 becomes small, and thus, it can be seen that the voltage induced in the feedback coil Lf2 is applied to the gates of the transistors Q11 and Q12 without being shifted in phase so much.

On the other hand, in FIG. 4B, in a state where the inductance value of the primary-side control coil Lc1 is the second value (small), the phase shift amount of the phase shift filter F10 is larger than that in the case of FIG. 4A, and the phase of the voltage generated in the feedback coil Lf2 is shifted by the phase shift filter F10 and applied to the gates of the transistors Q11 and Q12. As a result, as illustrated in FIG. 4B, it can be seen that the frequency of both the voltage waveform (thick line) generated in the feedback coil Lf2 and the voltage waveform (thin line) applied to the drive coil Ld3 changes from the waveform illustrated in FIG. 4A.

FIGS. 5A and 5B illustrate a voltage waveform (thick line) of the gate of the transistor Q12, a voltage waveform (thin line) between the drain and source of the transistor Q12, and a DC voltage level (substantially straight line) applied to the load resistance.

By comparing FIG. 5A and FIG. 5B, it can be seen that the oscillation period is longer and the DC voltage level applied to the load resistance, that is, the output voltage, is larger in the state where the inductance value of the primary-side control coil Lc1 is set to the first value (large) than in the state where the inductance value is set to the second value (small).

This indicates that, in a state where the inductance value of the primary-side control coil Lc1 is the first value (large), the oscillation frequency of the primary-side circuit 2 matches or is close to the resonance frequency, so that the output voltage is large, and in a state where the inductance value of the primary-side control coil Lc1 is the second value (small), the oscillation frequency of the primary-side circuit 2 is away from the resonance frequency, so that the output voltage is small.

As described above, according to the present embodiment, in the power supply circuit 1 of the first embodiment, it has been demonstrated that the output voltage can be controlled by changing the phase shift amount by the phase shift filter F10 depending on the magnitude of the inductance value of the primary-side control coil Lc1, and that the output voltage can be stabilized.

Some or all of the above-described embodiments and modifications can also be specified as follows. However, the above-described embodiments and modifications are not limited to the following description.

(1)

An output stabilization circuit including:

a primary-side circuit including a self-oscillation circuit connected to a DC power supply; and a secondary-side circuit that obtains an output voltage by oscillation of the self-oscillation circuit, wherein the self-oscillation circuit includes a power transmission coil, a resonance capacitor that is connected in series with the power transmission coil and constitutes a series resonant circuit together with the power transmission coil, a switching circuit including a plurality of switching elements connected in a half-bridge configuration or a full-bridge configuration, the switching circuit being configured to switch a direction of a current flowing through the power transmission coil in accordance with an on-off state of the plurality of switching elements, a drive transformer of which a secondary-side coil is connected to a gate electrode of each of the plurality of switching elements, a feedback transformer of which a primary-side coil is connected to the power transmission coil, and a phase shift filter connected between a secondary-side coil of the feedback transformer and a primary-side coil of the drive transformer, the secondary-side circuit includes a power reception coil magnetically coupled to the power transmission coil, and a secondary-side control coil in which a magnitude of a current flowing is controlled in accordance with a magnitude of the output voltage, and the phase shift filter includes a primary-side control coil that is magnetically coupled to the secondary-side control coil and has a characteristic that an inductance changes in accordance with the current flowing through the secondary-side control coil.

(2)

A DC-DC converter circuit including the output stabilization circuit according to claim (1), wherein the secondary-side circuit further includes a DC conversion circuit that converts an AC voltage generated in the power reception coil into a DC voltage.

The invention claimed is:

1. An output stabilization circuit comprising:

a primary-side circuit including a self-oscillation circuit connected to a DC power supply; and a secondary-side circuit that obtains an output voltage by oscillation of the self-oscillation circuit, wherein the self-oscillation circuit includes a power transmission coil, a resonance capacitor that is connected in series with the power transmission coil and constitutes a series resonant circuit together with the power transmission coil, a switching circuit including a plurality of switching elements connected in a half-bridge configuration or a full-bridge configuration, the switching circuit being configured to switch a direction of a current flowing through the power transmission coil in accordance with an on-off state of the plurality of switching elements, a drive transformer of which a secondary-side coil is connected to a gate electrode of each of the plurality of switching elements, a feedback transformer of which a primary-side coil is connected to the power transmission coil, and a phase shift filter connected between a secondary-side coil of the feedback transformer and a primary-side coil of the drive transformer, the secondary-side circuit includes a power reception coil magnetically coupled to the power transmission coil, and a secondary-side control coil in which a magnitude of a current flowing is controlled in accordance with a magnitude of the output voltage, and the phase shift filter includes a primary-side control coil that is magnetically coupled to the secondary-side control coil and has a characteristic that an inductance changes in accordance with the current flowing through the secondary-side control coil.

2. A DC-DC converter circuit comprising the output stabilization circuit according to claim 1, wherein the secondary-side circuit further includes a DC conversion circuit that converts an AC voltage generated in the power reception coil into a DC voltage.

\* \* \* \* \*